US006840233B2

(12) United States Patent
Lingenhult et al.

(10) Patent No.: US 6,840,233 B2
(45) Date of Patent: Jan. 11, 2005

(54) METHOD AND APPARATUS FOR MONITORING A CONTROLLABLE VALVE

(76) Inventors: Anders Lingenhult, Slottskogsgatan 50 B, 41470 Gothenburg (SE); Erik Sandberg, Ighagsgatan 3B, 41317 Gothenburg (SE)

(*) Notice: Subject to any disclaimer, the term of this patent is extended or adjusted under 35 U.S.C. 154(b) by 0 days.

(21) Appl. No.: 10/666,377

(22) Filed: Sep. 18, 2003

(65) Prior Publication Data

US 2004/0094133 A1 May 20, 2004

(51) Int. Cl.[7] ........................ F02M 33/04; G01M 19/00

(52) U.S. Cl. ......................... 123/519; 73/579; 73/118.1

(58) Field of Search ................................ 123/516–520, 123/198 D; 73/579, 587, 118.1, 119 A, 592

(56) References Cited

U.S. PATENT DOCUMENTS 4,791,810 A * 12/1988 Old et al. ................. 73/119 A
5,138,874 A * 8/1992 Davis ........................ 73/118.1
5,404,748 A * 4/1995 Jimison et al. ................ 73/40
5,426,971 A 6/1995 Glidewell et al.
5,493,902 A 2/1996 Glidewell et al.
5,780,728 A 7/1998 Takamori
6,082,337 A 7/2000 Fujimoto et al.
6,131,448 A 10/2000 Hyodo et al.
6,637,267 B2 * 10/2003 Fiebelkorn et al. ........... 73/587

* cited by examiner

*Primary Examiner*—Thomas N Moulis
(74) *Attorney, Agent, or Firm*—Diana D. Brehob

(57) ABSTRACT

The invention relates to a method and an arrangement for monitoring the operational status of a cyclically operated valve (5, 19), which valve is operated to allow a fluid or gaseous medium to flow from a first conduit (1, 18) to a second conduit (3, 20) due to a pressure difference between said conduits, whereby the valve (5, 19) operated using predetermined duty cycles. The method involves measuring pressure oscillations caused by the valve (5, 19) and generating an output signal, performing a frequency analysis on the signal to determine an amplitude for the signal at an oscillation frequency, comparing the amplitude of the oscillations to an expected amplitude for the oscillation frequency, and generating an error signal is if the difference between the calculated and the expected amplitudes exceeds a predetermined limit.

25 Claims, 5 Drawing Sheets

METHOD AND APPARATUS FOR MONITORING A CONTROLLABLE VALVE

FIELD OF THE INVENTION

The present invention relates to a method and an apparatus for monitoring the operational status of a controllable valve arranged to regulate a fluid or gaseous flow.

BACKGROUND

Cyclically operated or oscillating valves for regulating the flow of a fluid or gaseous medium are used in many applications. To ensure proper operation of a device or a process, it is desirable to monitor the mechanical function of such valves. By monitoring the valve or valves, it is possible to limit or prevent the occurrence of breakdowns and/or emissions caused by valve failure.

In general, vehicles are provided with a purge system to prevent fuel evaporated in a fuel tank from being discharged into the atmosphere. Instead, the evaporated fuel is absorbed in a canister containing activated carbon, which canister is placed in a conduit connecting the fuel tank and the intake pipe of the engine. The fuel absorbed by the canister over a period of time is released to the engine by a controllable purge valve. When the purge valve is opened, ambient air flows through the canister and draws fuel vapor into the engine. The direction of flow and the flow rate is a function of the pressure difference between the atmospheric pressure and the engine intake pressure. The purge valve is arranged to open only when the pressure differential between the atmosphere and the intake pipe is sufficient to cause flow in a desired direction.

A malfunction of the purge valve may cause increased fuel consumption, increased tailpipe emissions, and increased fuel escaping from the tank or the canister.

U.S. Pat. No. 5,780,728 discloses an arrangement provided with a pressure sensor in a purge line. The sensor is adapted to measure both the pressure in the purge line and in the engine intake pipe. The purge valve can be controlled in relation to the pressures and a number of further conditions, such as engine load, throttle opening and fuel injection pulse duration. By using a number of available signals and by adapting an existing pressure sensor for measuring purge line pressure, the system can be diagnosed without introducing further sensors. However, additional conduits and switching gear must be installed to connect the pressure sensor to both the purge line and the intake pipe. The function of the purge valve cannot be directly monitored.

U.S. Pat. No. 6,082,337 discloses an arrangement for diagnosing a purge system that has pressure sensors both in the fuel tank and the intake pipe. However, the arrangement is mainly directed toward monitoring leakage. The system can control an electromagnetic purge valve, but does not monitor its mechanical function.

U.S. Pat. No. 6,131,448 discloses an arrangement that diagnoses a purge system by estimating the space volume of the system using two duty ratios for the purge valve. The result can be used for detecting leakage in the system, but is not suitable for monitoring the purge valve function.

None of the known diagnostic arrangements disclose a method or an arrangement for monitoring the function of or performing diagnostic tests on a valve, such as a purge valve. This is required to ensure proper function and so that a warning is transmitted to the control system if a malfunction should occur. Hence, there exists a need for a simple and inexpensive solution to the problem of diagnosing the mechanical function of oscillating valves or other types of controllable valves for controlling a gaseous or fluid flow between two volumes, such as a purge valve for controlling the flow of fuel vapor from a canister to an engine intake pipe.

SUMMARY OF THE INVENTION

The invention relates to a method for monitoring the operational status of a cyclically operated valve, which valve is operated to allow a fluid or gaseous medium to flow from a first conduit to a second conduit due to a pressure difference between said conduits, whereby the valve operated using predetermined duty cycles. A basic embodiment of the invention involves the following steps:

- measuring pressure oscillations caused by the valve and generating an output signal,
- performing a frequency analysis on the signal to determine a calculated amplitude for the signal at an oscillation frequency,
- comparing the amplitude of the oscillations to an expected amplitude for the oscillation frequency,
- generating an error signal is if the difference between the calculated and the expected amplitudes exceeds a predetermined limit.

The opening and closing of the valve is duty-cycle controlled by an electronic control unit (ECU). The duty cycle used depends on the desired flow through the conduit, and may vary between 0% (fully closed) and 100% (fully open). According to a preferred embodiment, the duty cycle during the diagnosis is at or near 50%, when the valve is open during half the cycle and closed during the remaining portion of the cycle. However, the diagnosis of the valve may still be performed satisfactorily when the duty cycle is in the range of 30–70%. It is possible to monitor the function of the purge valve outside these duty cycles, that is below 30% and above 70%. However, the accuracy of such measurements is reduced due to the low signal to noise ratio in the output signal from the pressure sensor. As will be described below, the preferred range will give a more accurate result. The cycle time may of course vary with the type and size of the valve.

According to a preferred embodiment, the sampling of the oscillating pressure signal is performed continuously while the duty cycle is within the interval 30–70%. The duty cycle can either be allowed to vary or be kept at a substantially fixed value, e.g. at or near 50%.

According to a further preferred embodiment, the sampling is performed intermittently whenever a variable duty cycle is at or near 50%, that is, when the duty cycle dwells in this range or when it passes through the range during an adjustment of the duty cycle. If a more regular sampling is required, then the ECU can be instructed to set the duty cycle to 50% at predetermined intervals to allow sampling of the pressure signal. The latter operation can be carried out independently of or in combination with the previous, intermittent sampling.

The frequency analysis used to determine the amplitude of the signal may be a discrete Fourier transformation, such as:

$$X(k) = \sum_{n=0}^{N-1} x(n)e^{-j2\pi kn/N}$$

where k=[0, N−1] and;

X(k) is the frequency spectrum as a function of k, which defines the equally spaced frequencies $\omega_k=2\pi k/N$, x(n) is the signal vector to transform, as a function of the time index n, N is the number of samples to transform.

The valve is determined to be malfunctioning if the calculated amplitude is significantly lower than the expected amplitude, indicating that the valve is oscillating at a lower frequency than the transmitted control signal, or is lagging behind with respect to the expected amplitude. This could also be indicating that the valve is about to seize. If the valve is stuck in an open or closed position, there are no pressure pulses for the pressure sensor to detect, which gives a calculated amplitude at or near zero, depending on the signal-to-noise ratio.

According to one embodiment of the invention, the first conduit is supplied a fluid or gaseous medium from a first volume. The fluid or gaseous medium is then exhausted from the second conduit into a second volume. Flow between the conduits may be caused by a source of high pressure in the first volume or conduit, or a source of low pressure in the second conduit or volume. The source of pressure may be a pump, a compressor, an accumulator, or other, e.g., by connecting the second conduit to the air intake or exhaust of an engine. The pressure sensor can be placed either in the second conduit or in the second volume, downstream of the valve. This arrangement may be used for both laminar and turbulent flow through the conduit or volume containing the sensor.

According to an alternative embodiment, the pressure sensor is placed in the first conduit or in the first volume, upstream of the valve. This arrangement works for turbulent flow, but is preferably used for laminar flow through the conduit or volume containing the sensor.

According to a preferred embodiment of the invention, the first conduit draws a gaseous medium from a canister for absorbing vapor from a first volume. This volume can be a container in the form of a fuel tank. The gaseous medium is subsequently exhausted into a second volume in the form of an air intake conduit for at least one combustion chamber. In this case, the pressure difference is achieved by using the relatively low pressure in the intake manifold of the engine. The valve is a purge valve placed between a canister and the air intake, whereby the pressure oscillations are measured by an existing sensor in the intake manifold.

The invention is further related to an arrangement for monitoring the operational status of a cyclically operated valve, which valve is operated to allow a fluid or a gaseous medium to flow from a first conduit to a second conduit due to a pressure difference between said conduits, whereby the valve is arranged to be operated using predetermined duty cycles. As stated above, a pressure sensor may be arranged upstream or downstream of the valve to measure pressure oscillations caused by the opening and closing of the valve in the said conduit and to generate an output signal. An electronic control unit is arranged to perform a frequency analysis, such as a discrete Fourier transformation, on the signal to determine a calculated amplitude for the signal at the oscillation frequency. The control unit is further arranged to compare the amplitude of the oscillations to a known, expected amplitude for the oscillation frequency of a particular duty cycle. The ECU will generate an error signal if the difference between the calculated and the expected amplitudes exceed a predetermined limit.

According to the invention, the mechanical function of a cyclically operated valve is monitored by existing sensors in an arrangement. The invention both simplifies the diagnosis and ensures proper function of the valve in a cost effective way, as an available signal is processed by the diagnostics system.

BRIEF DESCRIPTION OF THE DRAWINGS

In the following text, the invention will be described in detail with reference to the attached schematic drawings. These drawings are used for illustration only and do not in any way limit the scope of the invention. In the drawings.

DETAILED DESCRIPTION

Figure 1:
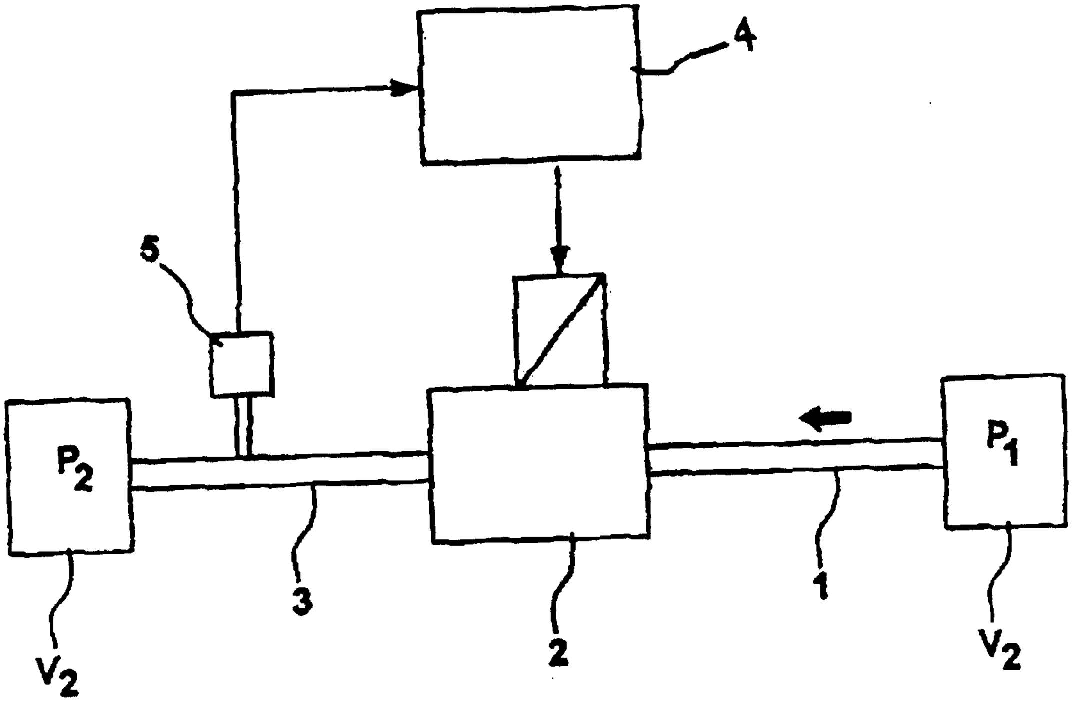
FIG. 1 shows a schematic diagram of a first embodiment of the invention, where a pressure sensor is placed downstream of the valve.

FIG. 1 shows a schematic diagram of one embodiment of the invention including a first conduit 1, an electronically operated valve 2 and a second conduit 3. A fluid or gaseous medium is arranged to flow into the first conduit 1, through the valve 2 and out of the second conduit 3, whenever the valve 2 is opened. The gaseous medium can be a gas or a vapor and is hereinafter termed "gas", while the fluid may be any type of flowing liquid. The source of the fluid or gas is a first volume V1 located upstream of the first conduit 1, while a second volume V2 is located downstream of the second conduit 3 for receiving said fluid or gas. The valve is arranged to open only when the pressure P1 in the first volume exceeds the pressure P2 in the second volume V2. This is monitored by an electronic control unit (ECU) 4, which uses the output signal from a pressure sensor 5 placed downstream of the valve 2 in combination with a number of known conditions relating to the first and second volumes. An example of this is described in connection with FIG. 3 below. In the current example, shown in FIG. 1, the pressure sensor 5 is placed in the second conduit 3, but it can also be positioned in the second volume V2. The pressure difference may be achieved in a number of ways, such as a compressor or accumulator connected to the first volume or a source of vacuum connected to the second volume.

When it is desired to open the valve 2 the ECU first ensures that the pressure difference is sufficient to create a minimum flow in a predetermined direction, and, if necessary, that one or more predetermined conditions are fulfilled. The ECU then transmits a signal to the valve 2, which in this case is a solenoid operated valve. The valve will remain open as long as the signal is transmitted by the ECU. The desired flow through the valve is controlled by regulating a duty cycle for the valve. The duty cycle can be selected between 0% (fully closed) and 100% (fully open).

In between the fully closed and fully open positions the valve is provided with a pulsed signal having a predetermined cycle time. For instance, at a 50% duty cycle with a cycle time of 0.2 s, the valve is opened for 0.1 s and closed for 0.1 s.

To check the mechanical function of the valve 2, that is whether the valve is opening and closing properly, the ECU 4 performs a diagnosis based on the output signal of the pressure sensor 5. A condition for enabling the diagnosis to be performed is that the pressure drop across the valve is sufficient for the sensor 5 to detect the pressure pulses caused by the valve. When performing the diagnosis of the valve, the duty cycle should preferably be within the range 30–70%. According to a further preferred embodiment, the duty cycle during the diagnosis is at or near 50%, when the valve is open during substantially half the cycle and closed during the remaining cycle. As will be described below, in connection with FIG. 5, the latter setting will give a more accurate result.

The output from the pressure sensor 5 to the ECU will give the average pressure in the second conduit (3) with a superposed oscillating pressure variation caused by the pulsating valve. The pressure oscillations caused by the opening and closing of the valve (2) can be used for monitoring its mechanical function by processing the output signal from the pressure sensor (5). The electronic control unit (4) is arranged to perform a frequency analysis, such as a discrete Fourier transformation, on the signal to determine a calculated amplitude for the signal at the oscillation frequency. The control unit is further arranged to compare the calculated amplitude of the oscillations to a known, expected amplitude for the oscillation frequency of a particular duty cycle. The expected amplitude can be, for example, programmed into the ECU based on engineering analysis of what the amplitude should be, on experimental data learned from testing the vehicle during vehicle development, and/or it may be learned by the ECU during operation of the vehicle in the field by the customer. The ECU will generate an error signal if the difference between the calculated and the expected amplitudes exceeds a predetermined limit.

An example of a discrete Fourier transformation that may be used to determine the calculated amplitude of the signal is $$X(k)=\sum_{n=0}^{N-1} x(n)e^{-j2\pi kn/N}$$

where k=[0, N−1] and;

X(k) is the frequency spectrum as a function of k, which defines the equally spaced frequencies $\omega_k=2\pi k/N$, x(n) is the signal vector to transform, as a function of the time index n, N is the number of samples to transform.

The valve is assumed to be malfunctioning if the calculated amplitude is significantly lower than the expected amplitude, indicating that the valve is oscillating at a lower frequency than, or is lagging behind, the transmitted control signal. This could also be an indication that the valve is about to seize. If the valve has stuck in an open or closed position there will be no pressure pulses for the pressure sensor to detect, which gives a calculated amplitude at or near zero depending on the signal-to-noise ratio.

In this, and in the following examples, an error signal may be generated if the calculated amplitude is "significantly lower" than the expected amplitude. The relative magnitudes of the expected amplitude and calculated amplitude is selected by setting a predetermined lower limit for the calculated amplitude. When the calculated amplitude drops below this error amplitude limit after one or more samplings the ECU is triggered to generate an error signal. According to one embodiment the error amplitude limit is a constant value that the calculated amplitude should exceed, when the monitoring conditions are fulfilled. According to a further embodiment is calibrated as function of duty cycle, that is the limit is allowed to vary with the magnitude of the expected amplitude over a range of duty cycles. In the latter case the limit can be selected as a percentage of the expected amplitude. As the characteristics of different types of valves may vary, the limit may be selected on the basis of experimental data or by testing in the field. In both embodiments the system can be given a predetermined sensitivity to errors, by selecting an error amplitude limit at a desired level below either the expected or a normal, calculated amplitude.

The above method can be applied to both laminar and turbulent flow, but is preferably used for turbulent, as the pressure oscillations are more present when the flow is turbulent. Hence it is advantageous to program the ECU to allow the valve to open when the pressure gradient between inlet and outlet ensures turbulent flow downstream of the valve.

Figure 2:
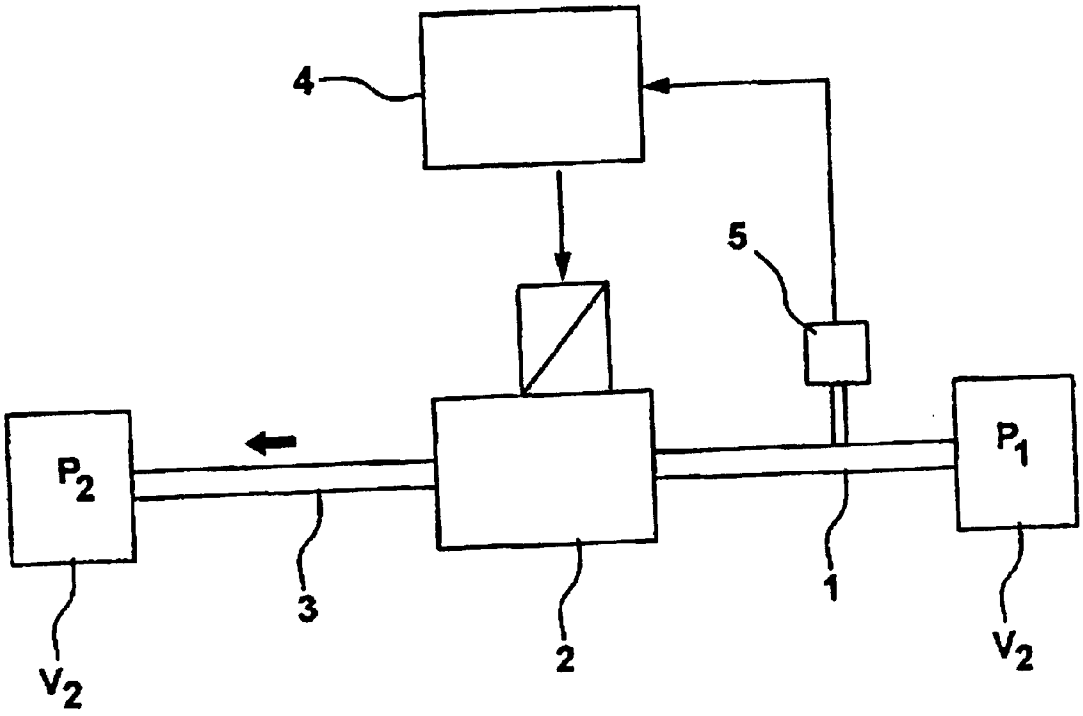
FIG. 2 shows a schematic diagram of a second embodiment of the invention, where a pressure sensor is placed upstream of the valve.

According to an alternative embodiment, shown in FIG. 2, the arrangement can also be used for monitoring the function of the valve when the direction of flow is opposite to that of the above example. In this case the a pressure sensor would be located upstream of the valve to be monitored. The monitoring operation would function in the same way as described in connection with FIG. 1. However, this arrangement is mainly suitable for laminar flow conditions through the conduit or volume containing the pressure sensor.

According to an alternative embodiment, the arrangement is provided with a pressure sensor on either side of the valve. This enables the ECU to monitor the function of the valve when fluid or gas is allowed to flow in both directions for both laminar and turbulent flow.

Figure 3:
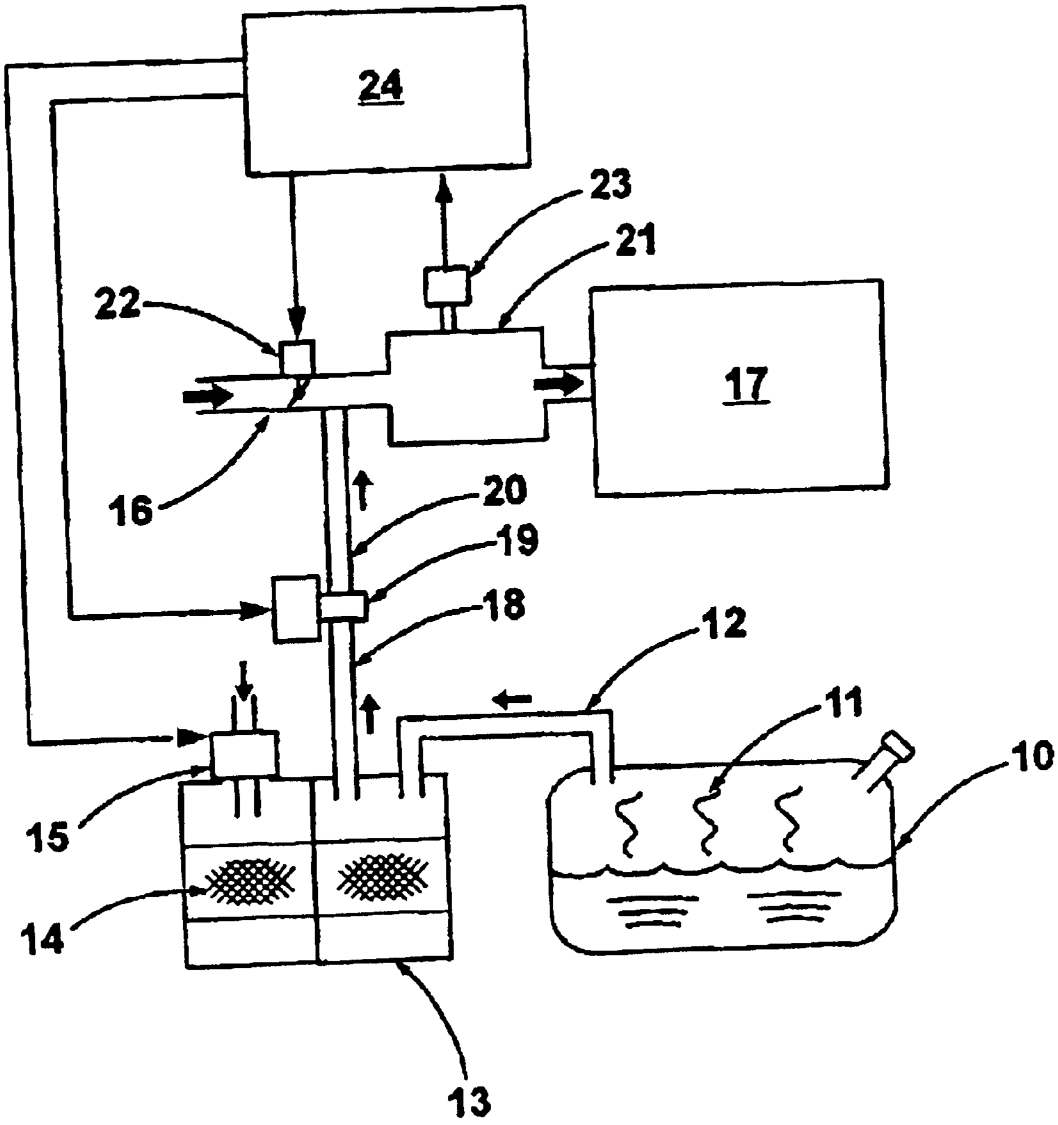
FIG. 3 shows a schematic diagram of a third embodiment of the invention.

FIG. 3 shows a schematic diagram of an embodiment of the invention describing one example of a practical use of the diagnostic method. In this case the arrangement comprises a fuel vapor purge system for a vehicle. The vehicle is provided with a fuel tank 10 from which evaporated fuel 11 is drawn through a fuel vapor conduit 12 into a canister 13. Canister 13 contains an absorbing material 14, such as activated carbon, that absorbs the evaporated fuel and prevents it from escaping to the atmosphere. When desorbing the canister 13, an electronically controlled valve 15 connecting the canister to the atmosphere is opened. This allows fresh air to be drawn through the canister 13, out through a series of conduits and into an air intake 16 of engine 17. The conduits includes a first conduit 18 connecting the canister to an electronically controlled valve 19, and a second conduit 20 connecting the electronically controlled purge valve 19 to the air intake conduit 16 to ensure that the flow of desorbed vapors is directed fro canister 13 to the intake conduit 16, the second conduit is attached to an intake manifold 21 after an electronically controlled throttle valve 22. For an normally aspirated engine, the pressure downstream of the throttle valve 22 is below atmospheric, making intake manifold 21 a suitable source of vacuum. Intake manifold 21 is provided with a pressure sensor 23 that transmits an output signal to an electronic control unit (ECU) 24 for monitoring the pressure in said manifold.

ECU 24 is programmed to desorb canister 13 under a number of predetermined conditions. When these conditions are fulfilled, ECU 24 first checks that the pressure in intake manifold 21 is below a predetermined level. If the pressure gradient is sufficient, then ECU 24 transmits a signal to valve 15 on canister 13 to open and admit ambient air into the canister. At the same time, or shortly before, ECU 24 transmits a pulsed signal to purge valve 19, connecting canister 13 to the source of low pressure provided in manifold 21. The pulsed signal to purge valve 19 has a frequency corresponding to a desired duty cycle for the valve. The duty cycle can vary between 0%, where the valve is closed, and 100%, where the valve is fully open. According to a preferred embodiment, the cycle time for a purge valve is typically 0.1 s. In this case, a duty cycle of 30% means that the valve is open during 0.03 s and closed during 0.07 s.

To measure these pressure pulses, a relatively fast sensor is used. The manifold air pressure sensor used in the preferred embodiment has a 5 ms rise time on a step response, which is fast compared to the 10 Hz pressure oscillation.

ECU 24 controls the duty cycle of the valve continuously depending on the desired flow of desorbed vapor and a number of external conditions. One such condition is the measured value of relative air/fuel ratio, λ, detected by a sensor in an engine exhaust conduit. Fuel vapor admitted to the air intake conduit will affect the air/fuel ratio in the cylinder, as it is difficult to predict the amount or concentration of fuel entering the intake. It is desirable to adjust the amount of fuel injected by the fuel injection system to compensate for the added fuel, but an accurate model for achieving this is presently not available. An alternative solution is to prevent operation of the purge valve when the engine is operated at a stoichiometric air/fuel ratio (λ=1). Purge is also prevented during a period of fuel cut-off for the fuel injectors. This occurs during engine braking or during cylinder deactivation, when no combustion occurs in one or more cylinders.

The pressure oscillations caused by the opening and closing of valve 19 is used for monitoring its mechanical function by processing the output signal from pressure sensor 23. Electronic control unit 24 is arranged to perform a frequency analysis, as described above, on the signal to determine an amplitude for the signal at the oscillation frequency, whereby control unit 24 is further arranged to compare the amplitude of the oscillations to an expected amplitude for the oscillation frequency of a particular duty cycle. ECU 24 generates an error signal if the difference between the calculated and the expected amplitudes exceeds a predetermined limit. Sampling of the signal can be performed intermittently, at regular intervals or continuously.

According to a preferred embodiment, the sampling is performed continuously when the duty cycle is in the interval 30–70%. The duty cycle can either be allowed to vary or be kept at a substantially fixed value, e.g. at or near 50%. A frequency analysis, such as a discrete Fourier transformation, performed on the oscillating pressure signal in this interval will give a result sufficiently accurate to determine whether purge valve 19 is operated at the frequency of the transmitted control signal from ECU 24. To make the algorithm more stable with respect to transients in absolute pressure caused by adjustments of throttle valve 22, the output signal from the pressure sensor is low-pass and high-pass filtered before the Fourier transform is performed. In this case, the low-pass filtering is performed to remove aliasing errors in the signal.

The discrete Fourier transformation used to determine the amplitude of the signal is $$X(k) = \sum_{n=0}^{N-1} x(n)e^{-j2\pi kn/N}$$

where k=[0, N−1] and;

X(k) is the frequency spectrum as a function of k, which defines the equally spaced frequencies $\omega_k$=2πk/N, x(n) is the signal vector to transform, as a function of the time index n, N is the number of samples to transform.

The valve is assumed to be malfunctioning if the calculated amplitude is significantly lower than the expected amplitude, as described above.

The above method can be used for both laminar flow in the purge conduit, using a sensor upstream of the valve, as indicated in FIG. 2, and for turbulent, or choked, flow in the intake manifold, using a sensor downstream of the valve as shown in FIG. 3.

Figure 4:
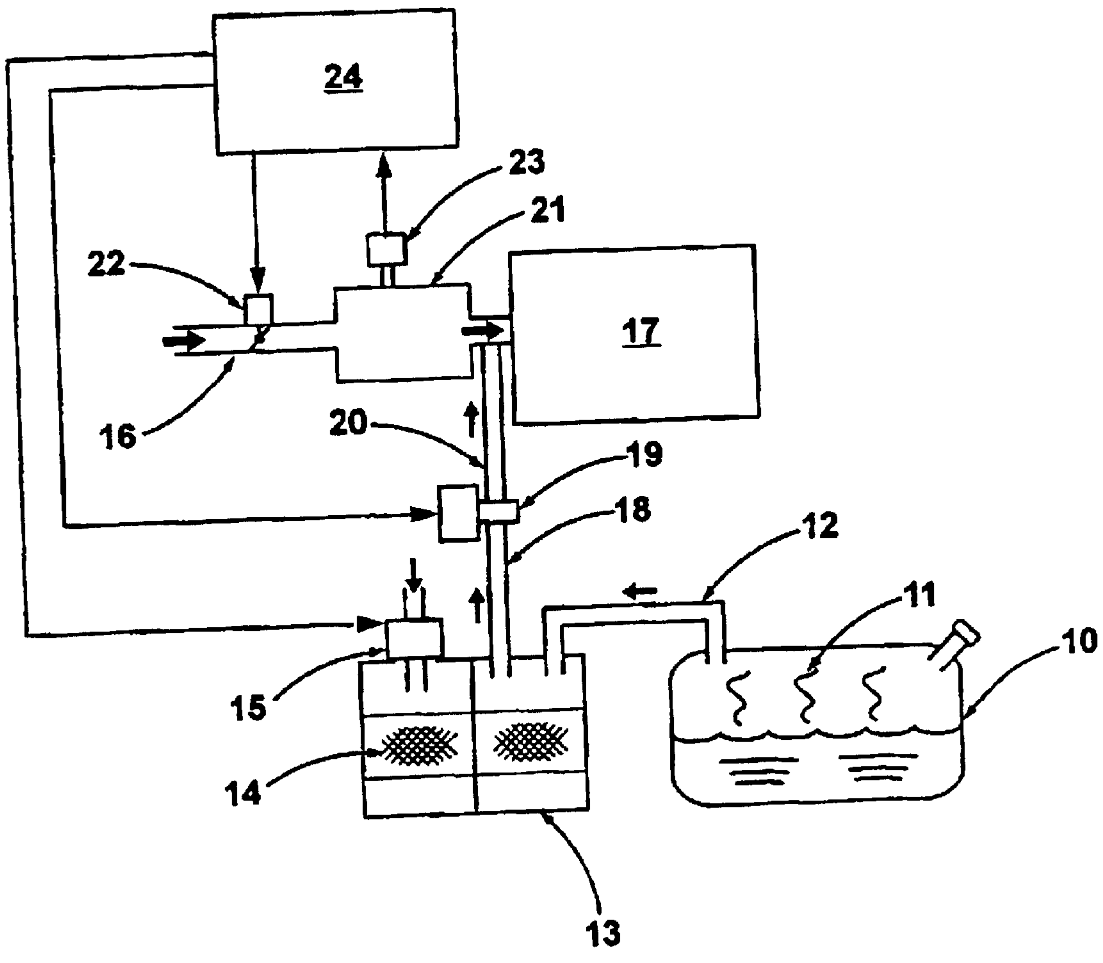
FIG. 4 shows a schematic diagram of a third embodiment of the invention.

An alternative embodiment of the purge valve arrangement, according to FIG. 3, is shown in FIG. 4. The main difference between these two embodiments is the arrangement of the second conduit 20 connecting purge valve 19 to intake manifold 21. In FIG. 4, the second conduit is attached to intake manifold 21 immediately adjacent engine 17. Preferably, the second conduit is split to be connected to each individual intake pipe. In this way, pressure sensor 23 is positioned upstream of the source of the pressure pulses, that is the purge valve 19. However, the function of the arrangement is substantially the same as for the embodiment described in connection with FIG. 3.

By connecting second conduit 20 to intake manifold 21, or pipe, very near the intake valves of engine 17, it is possible to achieve a better distribution of the purged vapors between the cylinders, i.e. same amount purge gas is supplied to each cylinder. As this arrangement of the second conduit uses a conduit that is split downstream of the purge valve, the conduit for each intake pipe is supplied with a separate non-return return valve. This arrangement of split conduits with non-return valves for each intake pipe is used for ventilation of crankcase gases from the oil sump. The same, or a similar system can be used for the purged vapors from the canister.

It is possible to monitor the function of the purge valve outside these duty cycles, that is below 30% and above 70%. However, the accuracy of such measurements is reduced due to the low signal to noise ratio in the output signal from the pressure sensor. Noise increases when the absolute pressure in the intake manifold is large, or when the pressure drop increases between the canister and the intake manifold. The pressure signal may also include noise from pressure variations caused by throttle adjustments and reflected pressure pulses from the combustion chamber and the intake valve or valves, especially at high engine speeds.

Figure 5:
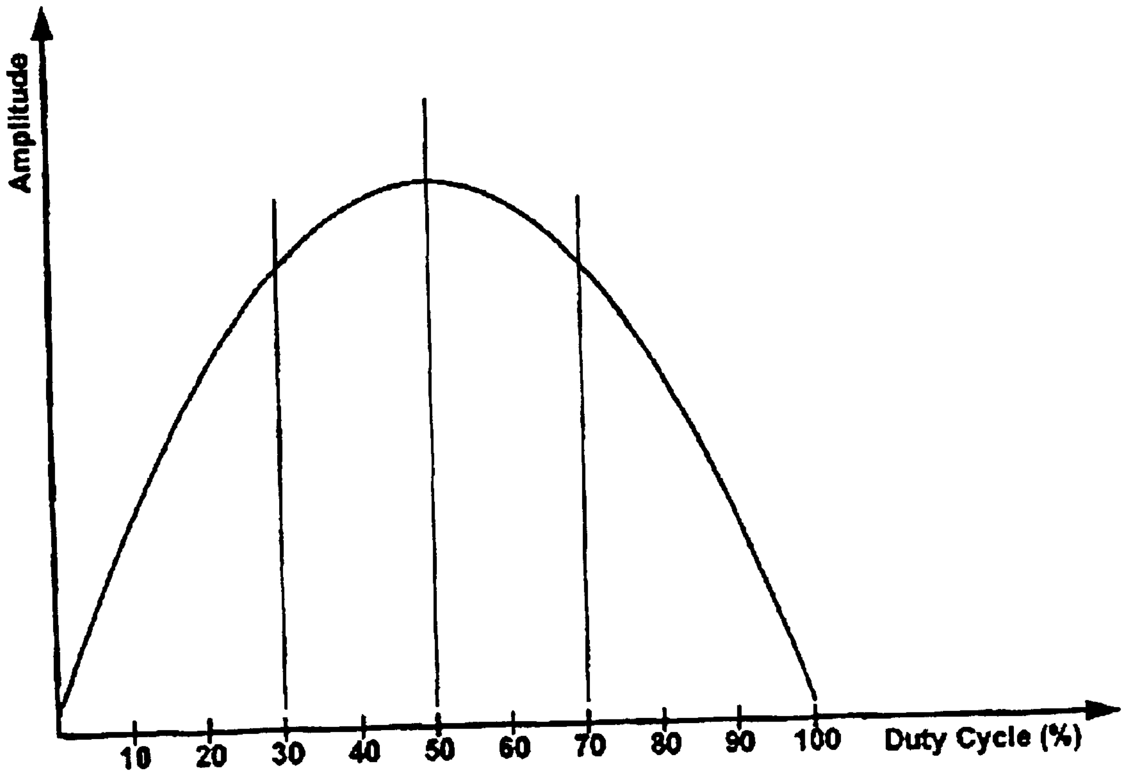
FIG. 5 shows a diagram wherein amplitude is plotted over duty cycle.

According to a further preferred embodiment the sampling is performed when the duty cycle is at or near 50%. The base frequency of the pressure oscillation has its maximum amplitude when the duty cycle is around 50%, which makes the end result of the discrete Fourier transform more accurate. This is illustrated in FIG. 5, which shows a diagram wherein amplitude is plotted over duty cycle. Theoretically the pressure pulses will be similar to a harmonic oscillation when the duty cycle is near 50% and the signal to noise ratio at this specific frequency will be high. As described above, the output signal from the pressure sensor is low-pass and high-pass filtered before the discrete Fourier transform is performed.

As the duty cycle varies depending on the desired instantaneous flow rate, as controlled by the ECU, constant monitoring of the mechanical function of the purge valve in a relatively narrow range of duty cycles may not always be possible. Instead, sampling occurs intermittently whenever the variable duty cycle is at or near 50%, that is when the duty cycle dwells in this range or when it passes through the range during an adjustment of the duty cycle. If a more regular sampling is required, then ECU 24 is instructed to set the duty cycle to 50% at predetermined intervals to allow sampling of the pressure signal. The latter operation is carried out independently of or in combination with the previous, intermittent sampling.

According to a further embodiment applicable to all the above embodiments, the frequency analysis to generate a calculated amplitude of the pressure signal at the oscillation frequency is filtered by an analog or digital bandpass filter around the oscillation frequency.

If the ECU generates an error signal, this indicates that the purge valve is either stuck in a position or not operating at the desired duty cycle. An indication of a stuck valve is the absence of pressure oscillations during a sampling sequence. It is then possible to use an existing leakage detection diagnosis, normally used to detect fuel tank leakage, to determine whether the valve is stuck in a closed or an open position. Additionally, ECU 24 can generate a first error signal if the calculated and expected amplitudes differ significantly, as described above, and a second error signal if the calculated amplitude is at or near zero. The first signal indicates that the valve is malfunctioning, but that it is still at least partially operative, while the second signal indicates that the valve and the purge system is inoperative. This could be used to instruct the diagnostics system of the car to monitor the valve more often, when the first error signal is generated, and/or to warn the user that service is required, when the second error signal is generated. Apart from warning the user, by a warning lamp or LED, a signal can be transmitted to a relevant service location by an on-board telematics system in the vehicle.

The invention allows the mechanical function of a cyclically operated valve to be monitored by one or more existing sensors in an arrangement which both simplifies the diagnosis and ensures that the user is notified if a significant part of the purge system for evaporated fuel in a vehicle shows signs of malfunction or fails suddenly.

The invention is not limited to the above embodiments, but may be modified within the scope of the attached claims.

We claim:

1. A method for monitoring operational status of a cyclically operated valve (5, 19), which valve is operated to allow a fluid or gaseous medium to flow from a first conduit (1, 18) to a second conduit (3, 20) due to a pressure difference between said conduits, whereby the valve (5, 19) operated using at least one predetermined duty cycles, comprising:

- measuring pressure oscillations caused by the valve (5, 19) and generating an output signal;
- performing a frequency analysis on the signal to determine an amplitude for the signal at an oscillation frequency;
- comparing the amplitude of the oscillations to an expected amplitude for the oscillation frequency; and
- generating an error signal if the difference between the calculated and the expected amplitudes exceeds a predetermined limit.

2. The method according to claim 1 wherein measuring of the pressure oscillations is performed when the duty cycle is within the range 30–50%.

3. The method according to claim 2 wherein measuring of the pressure oscillations is performed using continuous sampling.

4. The method according to claim 2 wherein the duty cycle is at or near 50%.

5. The method according to claim 4 wherein, when the duty cycle is substantially constant, measuring of the pressure oscillations is performed using constant sampling.

6. The method according to claim 4 wherein, when the duty cycle is variable, measuring of the pressure oscillations is performed using intermittent sampling, whenever the duty cycle is at or near 50%.

7. The method according to claim 4 wherein when the duty cycle is variable, measuring of the pressure oscillations is performed using a regular sampling, by setting the duty cycle to 50% at predetermined intervals.

8. The method according to claim 1 wherein the valve (5, 19) is determined to be malfunctioning if the calculated amplitude is significantly lower than the expected amplitude.

9. The method according to claim 8 wherein the valve (5, 19) is determined to be malfunctioning if the calculated amplitude is at or near zero.

10. The method according to claim 1 wherein the frequency analysis is performed using a discrete Fourier transformation.

11. The method according to claim 10 wherein the discrete Fourier transformation used to determine the amplitude of the signal is $$X(k)=\sum_{n=0}^{N-1} x(n)e^{-j2\pi kn/N}$$

where k=[0, N−1] and;

X(k) is the frequency spectrum as a function of k, which defines the equally spaced frequencies $\omega_k=2\pi k/N$, and x(n) is the signal vector to transform, as a function of the time index n, N is the number of samples to transform.

12. An arrangement for monitoring operational status of a cyclically operated valve (5, 19), which valve is operated to allow a fluid or gaseous medium to flow from a first conduit (1, 18) to a second conduit (3, 20) due to a pressure difference between said conduits, whereby the valve (5, 19) is arranged to be operated at a predetermined frequency and at various duty cycles, comprising:

- a pressure sensor (2, 23) arranged to measure pressure oscillations caused by the valve (5, 19) in at least one of the said conduits (1, 18; 3, 23) and to generate an output signal;
- a control unit (4, 24) coupled to said pressure sensor performs a frequency analysis on the output signal to calculate an amplitude for the signal at the oscillation frequency said control unit (4, 24) further compares said calculated amplitude to an expected amplitude for the oscillation frequency of a particular duty cycle, said control unit further generates an error signal when a difference between said calculated and said expected amplitudes exceed a predetermined limit.

13. The arrangement according to claim 12 wherein the valve (5, 19) is operated at a duty cycle within the range 30–70%.

14. The arrangement according to claim 13 wherein the valve (5, 19) is operated at a duty cycle at or near 50%.

15. The arrangement according to claim 12 wherein said pressure sensor (2, 23) is located downstream of the valve (5, 19).

16. The arrangement according to claim 12 wherein said pressure sensor (2, 23) is located upstream of the valve (5, 19).

17. The arrangement according to claim 12 wherein said frequency analysis performed is a discrete Fourier transformation.

18. The arrangement according to claim 17 wherein said discrete Fourier transformation performed to determine the amplitude of said $$X(k) = \sum_{n=0}^{N-1} x(n)e^{-j2\pi kn/N}$$

where k=[0, N−1] and;

X(k) is a frequency spectrum as a function of k, at equally spaced frequencies $\omega_k=2\pi k/N$, and x(n) is a signal vector to transform, as a function of time index n, N is a number of samples to transform.

19. The arrangement according to claim 12 wherein said control unit (4, 24) further generates an error signal when said calculated amplitude is significantly lower than said expected amplitude.

20. The arrangement according to claim 12 wherein said control unit (4, 24) further generates an error signal when the calculated amplitude is at or near zero.

21. The arrangement according to claim 12 wherein the first conduit (1, 18) is connected to a canister (13) arranged to absorb vapor from a container.

22. The arrangement according to claim 21, wherein said vapor is evaporated fuel from a fuel tank (10).

23. The arrangement according to claim 12 wherein the second conduit (3, 20) is connected to an air intake manifold (21) for an internal combustion engine (17).

24. The arrangement according to claim 23 wherein said pressure sensor (23) in said intake manifold (21) is arranged to measure the pressure oscillations upstream of said pressure sensor.

25. The arrangement according to claim 23 wherein said pressure sensor (23) in said intake manifold (21) is arranged to measure pressure oscillations downstream of said pressure sensor.

* * * * *